June 2, 1970               R. K. PITLER               3,514,840

METHOD OF FABRICATING NARROW-WIDTH COMPOSITES

Filed April 18, 1968

INVENTOR
RICHARD K. PITLER
BY James A. Barneburg
his
ATTORNEY

United States Patent Office 3,514,840
Patented June 2, 1970

---

3,514,840
METHOD OF FABRICATING NARROW-WIDTH COMPOSITES
Richard K. Pitler, Gibsonia, Pa., assignor to Allegheny Ludlum Steel Corporation, Brackenridge, Pa., a corporation of Pennsylvania
Filed Apr. 18, 1968, Ser. No. 722,283
Int. Cl. B23k 31/02
U.S. Cl. 29—470.1          5 Claims

ABSTRACT OF THE DISCLOSURE

Fabrication of narrow-width composites by alternately disposing elongated strips of core material and cladding material side by side to a desired width, encasing the disposed strips with cladding material and pressure bonding the thusly arranged components into a wide composite assembly. The wide composite assembly is then longitudinally cut or slit at the cladding material strips to produce a plurality of narrow-width composites along their longitudinal surfaces.

BACKGROUND OF THE INVENTION

This invention relates to a method of fabricating narrow-width composites. More particularly, the invention concerns a method of fabricating narrow-width composites by simultaneously processing a plurality of individual composites in the form of a wide composite assembly. The method is particularly useful for economically producing narrow-width composites clad along all longitudinal surfaces.

In many applications it is of value to use a composite made from two or more materials so as to combine the best properties of each material and eliminate or minimize their deficiencies. Examples of such composites are stainless steel clad copper, aluminum clad steel, tin plate, etc.

During the manufacture of composites in flat rolled form it is advantageous to roll the product as wide as possible to minimize manufacturing costs. If narrow widths are required, the wide composites, after reduction to desired gauge, may be cut or slit to specifications. A disadvantage to this approach, however, is that when the wide composite is slit the core material is exposed along the edges of the resulting narrow-width composite. Dependent upon the intended application of the narrow-width composite, serious difficulties may follow as a result of the core material being exposed at the edges. For example, fabrication problems may arise during welding operations and in any case the narrow-width composite will not have the full advantage of the protection afforded by the cladding to the core if portions of the core are exposed. This latter factor is of particular importance where the cladding is used to protect the core from corrosion, abrasion and wear.

It has now been discovered that it is possible to fabricate narrow-width composites so as to take advantage of the economy of fabricating several at the same time. By practicing the invention, narrow-width composites may be made of core strips clad along all longitudinal surfaces which are particularly useful in applications such as the manufacture of seam-welded tubing since the welds can be made between clad material surfaces without danger of exposing the core material.

It is, therefore, an object of this invention to provide a method for fabricating wide composite assemblies adapted to be cut or slit into narrow-width composites which are clad along all their longitudinal surfaces.

SUMMARY OF THE INVENTION

In accordance with the invention, elongated strips of core material and cladding material are alternately positioned side by side to a desired width, the first and last strip being cladding material. Wide sheets of cladding material are then positioned over and under the thusly disposed strips to form a sandwich assembly which is fabricated as a unit structure to pressure bond the components into a composite. The fabricated composite assembly is then longitudinally cut or slit at or through the cladding material strips to produce narrow-width composites that are clad along their longitudinal surfaces.

BRIEF DESCRIPTION OF THE DRAWING

The above and other objects and features of the invention will become apparent from the following detailed description taken in conjunction with the accompanying drawings which form a part of this specification and in which.

DESCRIPTION

Figure 1:
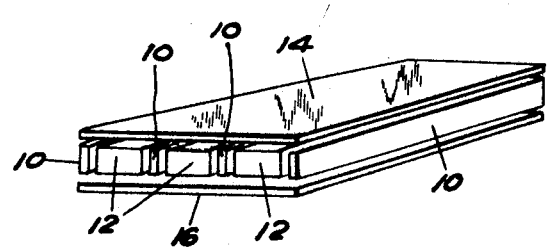
FIG. 1 is an exploded view of the composite assembly prior to fabricating.

Referring now to the drawings for a clearer understanding of the nature of the invention, alternate strips of cladding material 10 and core material 12 are adjacently positioned to a desired width. Strips of cladding material are placed at the outermost longitudinal surfaces of the first and last core material strips. Sheets 14 and 16 are cladding material, wide enough to extend over the width of the adjacently disposed strips 10 and 12, and are positioned over and under the strips respectively to form a composite or sandwich assembly. The width of the sheets 14 and 16 are, of course, determined by the width of the composite assembly 18 since these sheets form the upper and lower cladding for core material strips 12. It is apparent that the width of the composite 18 is controlled by the number of alternately disposed cladding material strips 10 and core material strips 12 that are assembled, and the number of these strips, as well as their dimensions, e.g., thickness, width, etc. may be varied as desired.

Figure 2:
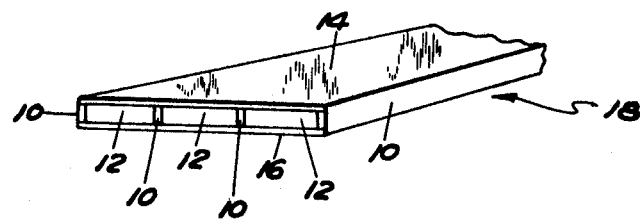
FIG. 2 is a perspective view of the composite assembly after fabrication.
Figure 3:
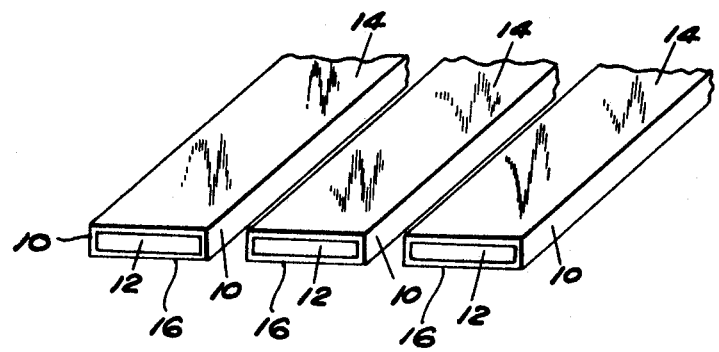
FIG. 3 is an enlarged perspective of the narrow-width composites after slitting the composite assembly.

After positioning the components as described, the sandwhich assembly is fabricated by pressure bonding the cladding material generally by rolling into the composite assembly 18, as shown in FIG. 2. Following fabrication, to pressure bond the components, the composite assembly 18 is cut or slit into segments of cladded core composites of narrow-width as shown in FIG. 3.

Various modifications of the above are possible within the scope of the invention. For example, the cladding material strips used in the interior of the assembly may be wider than the outermost cladding material strips at the longitudinal edges of the assembly so that, after slitting, each narrow-width composite will have equivalent cladded surfaces. However, cladding material strips of unequal size may be used to achieve special effects. Conversely, cladding material strips of uniform thickness may be used by interposing a parting compound between or otherwise preventing bonding of adjacently disposed strips of cladding material. Similarly, parting compounds may also be used between one or more core material and cladding material interfaces, if desired, to prevent bonding thereof. It is essential, however, that the strips of cladding material be bonded, i.e., metallurgically bonded to the cover sheets. This enables individual narrow-width composites to be produced which have integral cladding material surfaces.

Various means of fabricating the sandwich assembly to pressure bond the cladding material strips and cover sheets may be used so long as a metallurgical bond is achieved; however, the presently presently preferred technique is roll bonding. The force to be applied will, of course, vary depending upon the materials used and their dimensions.

Where it is desired to produce continuous lengths of the composite assembly, a continuous operation such as an arrangement whereby the components are positioned automatically and fed through a rolling mill may be used.

The final operation of the invention consists of cutting, e.g. sawing, shearing, and/or slitting the composite assembly longitudinally at or through the cladding material strips, depending on the arrangement of strips utilized, to form a plurality of narrow-width composites, clad along their longitudinal surfaces as shown in FIG. 3. Obviously, any conventional method of cutting may be used to accomplish this purpose so long as the finished, narrow-width composites are encased in cladding material of the desired thickness. In those instances where it is desirable to have the head and tail edges of the narrow-width composite cladded, cladding material strip may be positioned at these locations when the sandwich assembly is pressure bonded into a composite. In such cases it may be desirable to weld the first and last such strips into place. In like manner, short individual composites may be produced by interposing cladding material strips between lengths of core material strip.

Although a preferred embodiment of this invention has been shown and described, it is to be understood that various adaptations and modifications may be resorted to without departing from the scope of the appended claims.

I claim:
1. A method of producing clad composites of narrow width comprising:
   (a) alternately disposing a plurality of elongated strips of cladding material and core material side by side, the first and last alternate strips being of cladding material,
   (b) positioning a cover sheet of cladding material over and under said alternately disposed strips to form a sandwich assembly, said sheets of cladding material being at least wide enough to extend over the width of said alternately disposed strips,
   (c) pressure bonding said strips of cladding material to said cover sheets of cladding material to form a composite assembly, and
   (d) cutting said composite assembly longitudinally at the cladding material strips to produce narrow-width composites of core material strips clad along their longitudinal surfaces.

2. A method as recited in claim 1 wherein said pressure bonding is effected by rolling.

3. A method as recited in claim 2 wherein said components of said sandwich assembly are continuously fed into a rolling mill to produce a continuous length of pressure-bonded composite.

4. A method as recited in claim 1 in which the width of each of the core material strips is greater than that of the cladding material strips, and both the cladding material and the core material strips may vary dimensionally from like strips in the same composite assembly.

5. A method as recited in claim 1 in which the core material strips and the cladding material strips are bonded to the cover sheets of cladding material to each other during the pressure bonding step.

References Cited

UNITED STATES PATENTS

| | | | |
|---|---|---|---|
| 3,044,160 | 7/1962 | Jaffee | 29—480 XR |
| 3,427,706 | 2/1969 | Jaffee | 29—471.1 |
| 3,447,231 | 6/1969 | Jaffee | 29—497.5 |
| 3,453,717 | 7/1969 | Pfaffenberger et al. | 29—497.5 XR |
| 3,419,951 | 1/1969 | Carlson | 29—470.1 |

CHARLIE T. MOON, Primary Examiner

R. B. LAZARUS, Assistant Examiner.

U.S. Cl. X.R.

29—481, 497.5, 471.1